United States Patent
Bowers et al.

(10) Patent No.: US 7,124,328 B2
(45) Date of Patent: Oct. 17, 2006

(54) CAPTURING SYSTEM ERROR MESSAGES

(75) Inventors: Wayne J. Bowers, Fremont, CA (US); Zenon Fortuna, El Cerrito, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 656 days.

(21) Appl. No.: 10/365,680

(22) Filed: Feb. 12, 2003
(Under 37 CFR 1.47)

(65) Prior Publication Data
US 2004/0078695 A1 Apr. 22, 2004

Related U.S. Application Data

(60) Provisional application No. 60/380,453, filed on May 14, 2002.

(51) Int. Cl.
*G06F 11/00* (2006.01)

(52) U.S. Cl. ...................................................... 714/39

(58) Field of Classification Search .................. 714/39, 714/47, 48, 49, 56, 57
See application file for complete search history.

(56) References Cited

U.S. PATENT DOCUMENTS

| | | | | |
|---|---|---|---|---|
| 5,748,884 A | * | 5/1998 | Royce et al. | 714/57 |
| 6,058,494 A | * | 5/2000 | Gold et al. | 714/42 |
| 6,434,715 B1 | * | 8/2002 | Andersen | 714/39 |
| 6,654,908 B1 | * | 11/2003 | Lindsay et al. | 714/20 |
| 6,701,451 B1 | * | 3/2004 | Cohen et al. | 714/5 |
| 6,769,073 B1 | * | 7/2004 | Shapiro | 714/11 |
| 6,976,191 B1 | * | 12/2005 | Kitamorn et al. | 714/43 |
| 2004/0153770 A1 | * | 8/2004 | Lindsay | 714/20 |

* cited by examiner

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

The present invention provides a method and apparatus for capturing system error messages. The method includes accessing information associated with an error. The method further includes identifying a category associated with the error based upon the accessed information and accessing at least one pre-determined attribute in the accessed information based upon the identified category.

29 Claims, 6 Drawing Sheets

CAPTURING SYSTEM ERROR MESSAGES

This application claims the benefit of U.S. Provisional Application No. 60/380,453 entitled "CAPTURING SYSTEM ERROR MESSAGES", filed May 14, 2002.

BACKGROUND OF THE INVENTION

1. Field of the Invention

This invention relates generally to processor-based systems, and, more particularly, to capturing error messages in processor-based systems.

2. Description of the Related Art

Businesses may use processor-based systems to perform a multiplicity of tasks. These tasks may include, but are not limited to, developing new software, maintaining databases of information related to operations and management, and hosting a web server that may facilitate communications with customers. To handle such a wide range of tasks, businesses may employ a processor-based system in which some or all of the processors may operate in a networked environment.

Processor-based systems are, however, prone to errors that may compromise the operation of the system. For example, a software package running on a processor may request access to a memory location that may already have been allocated to another software package. Allowing the first program to access the memory location could corrupt the contents of the memory location and cause the second program to fail, so the system may deny the first program access and return a system error message. The first program may then fail, perhaps disrupting the operation of the processor and/or the network. Similarly, disconnected power cables, pulled connection wires, and malfunctioning hardware may also disrupt operation of the system.

An error that interferes with or otherwise adversely affects the operation of the system may limit the ability of the business to perform crucial tasks and may place the business at a competitive disadvantage. For example, if a customer cannot reach the business's web site, they may patronize a different business. The competitive disadvantage may increase the longer the system remains disrupted. Thus, it may be desirable to identify the cause of the error and thereafter fix the error as quickly as possible.

However, it may be difficult to identify the root cause of many errors. For example, the system may comprise dozens of individual processors and each processor may be running one or more pieces of software, including portions of an operating system. The system may further comprise a variety of storage devices like disk drives and input/output (I/O) devices such as printers and scanners. The complexity of the system may be reflected in a bewildering variety of errors that may be produced by components of the system. Furthermore, a single root cause may propagate to other devices and/or software applications in the system and generate a chain of seemingly unrelated errors. Tracing the chain of messages back to the root cause may be a time-consuming task for the system administrator.

Once the root cause has been identified, finding a solution may also be problematic. Select hardware or software applications may each maintain a separate list of solutions to known errors, but the lists may be incomplete or outdated. And even if a solution to an error exists, the system administrator or technician may be obliged to read through many pages of manuals to find the solution.

SUMMARY OF THE INVENTION

In one aspect of the instant invention, an apparatus is provided for capturing system error messages. The apparatus includes a bus. The apparatus further includes a processor coupled to the bus, wherein the processor is adapted to detect a triggering event associated with an error, to wake a sleeping process to access information associated with the error in response to detecting the triggering event, to categorize the error based on the accessed information, and to access selected information from the accessed information based on the category of the error.

In one aspect of the present invention, a method is provided for capturing system error messages. The method includes accessing information associated with an error. The method further includes identifying a category associated with the error based upon the accessed information and accessing at least one pre-determined attribute in the accessed information based upon the identified category.

BRIEF DESCRIPTION OF THE DRAWINGS

The invention may be understood by reference to the following description taken in conjunction with the accompanying drawings, in which like reference numerals identify like elements, and in which.

Figure 1:
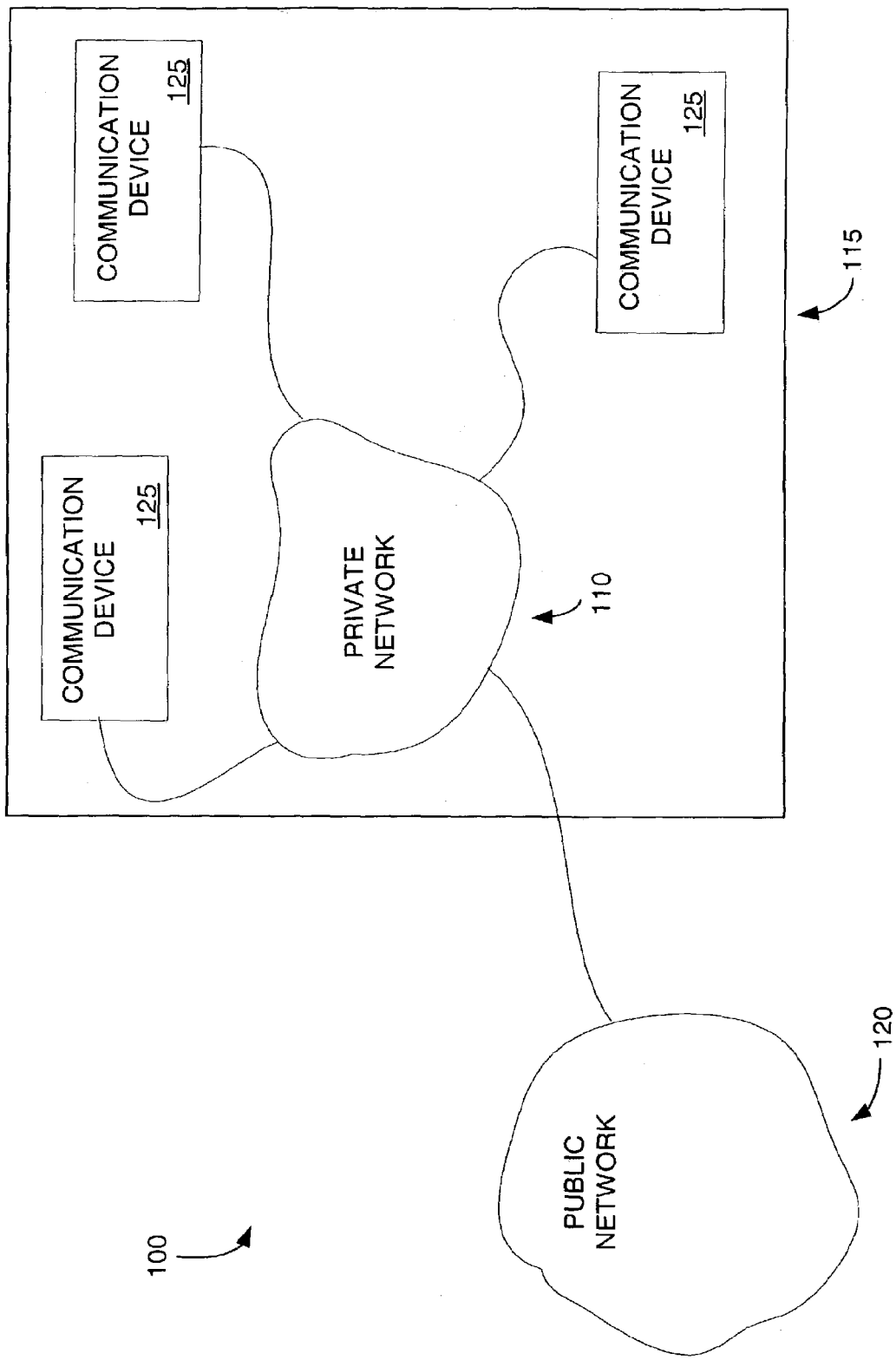
FIG. 1 shows a block diagram of a communications system that includes various nodes or network elements that are capable of communicating with each other, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows a stylized block diagram of an exemplary communications system 100 comprising various nodes or network elements that are capable of communicating with each other. The example network elements and the manner in which they are interconnected are for illustrative purposes only, and are not intended to limit the scope of the invention. A variety of other arrangements and architectures are possible in further embodiments.

The communications system 100 may include a private network 110 that is located in a community 115 coupled to a public network 120 (e.g., the Internet). A "private network" refers to a network that is protected against unauthorized general public access. A "network" may refer to one or more communications networks, links, channels, or paths, as well as routers or gateways used to pass data between elements through such networks, links, channels, or paths. Although reference is made to "private" and "public" networks in this description, further embodiments may include networks without such designations. For example, a community 115 may refer to nodes or elements coupled through a public network 120 or a combination of private and public networks 110, 120.

The nodes or elements may be coupled by a variety of means. The means, well known to those of ordinary skill in the art, may comprise both physical electronic connections such as wires and/or cables and wireless connections such as radio-frequency waves. Although not so limited, the wireless data and electronic communications link/connection may also comprise one of a variety of links or interfaces, such as a local area network (LAN), an internet connection, a telephone line connection, a satellite connection, a global positioning system (GPS) connection, a cellular connection, a laser wave generator system, any combination thereof, or equivalent data communications links.

In one embodiment, the communication protocol used in the various networks may be the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks may communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

The communications system 100 may comprise a plurality of communication devices 125 for communicating with the network 110, 120. The communications devices 125 may comprise computers, Internet devices, or any other electronic device capable of communicating with the network. Further examples of electronic devices may comprise telephones, fax machines, televisions, or appliances with network interface units to enable communications over the private network 110 and/or the public network 120.

Figure 2:
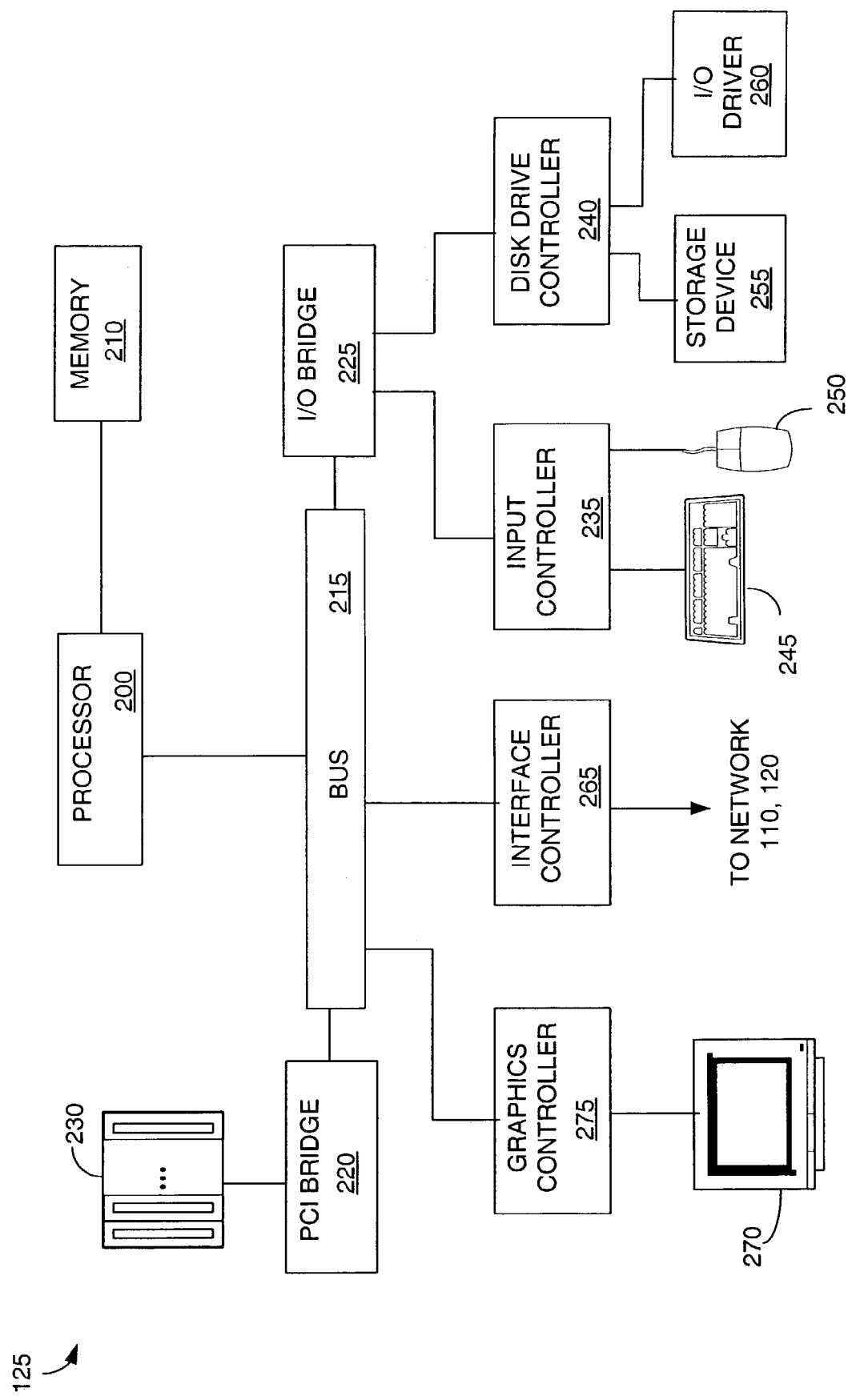
FIG. 2 shows a block diagram of one embodiment of a communication device that may be employed in the communications network shown in FIG. 1.

FIG. 2 shows a block diagram of one embodiment of the communication device 125. For example, the communication device 125 may be a workstation such as the Sun Blade 100 Workstation. The communication device 125 may comprise at least one processor 200 adapted to perform one or more tasks or to spawn one or more processes. Although not so limited, in one embodiment, the processor 200 may be a 500-MHz UltraSPARC-IIe processor. The processor 200 may be coupled to at least one memory element 210 adapted to store information. For example, the memory element 210 may comprise 2-gigabytes of error-correcting synchronous dynamic random access memory (SDRAM) coupled to the processor via one or more unbuffered SDRAM dual in-line memory module (DIMM) error-correcting slots.

In one embodiment, the memory element 210 may be adapted to store a variety of different forms of information including, but not limited to, one or more of a variety of software programs, data produced by the software and hardware, and data provided by the private and public networks 110, 120. Although not so limited, the one or more software programs stored in the memory element 210 may include software applications (e.g. database programs, word processors, and the like) and at least a portion of an operating system (e.g. the Solaris operating system). The source code for the software programs stored in the memory element 210 may, in one embodiment, comprise one or more instructions that may be used by the processor 200 to perform various tasks or spawn various processes.

The processor 200 may be coupled to a bus 215 that may transmit and receive signals between the processor 200 and any of a variety of devices that may also be coupled to the bus 215. For example, in one embodiment, the bus 215 may be a 32-bit-wide, 33-MHz peripheral component interconnect (PCI) bus. A variety of devices may be coupled to the bus 215 via one or more bridges, which may include a PCI bridge 220 and an I/O bridge 225. It should, however, be appreciated that, in alternative embodiments, the number and/or type of bridges may change without departing from the spirit and scope of the present invention. In one embodiment, the PCI bridge 220 may be coupled to one or more PCI slots 230 that may be adapted to receive one or more PCI cards, such as Ethernet cards, token ring cards, video and audio input, SCSI adapters, and the like.

The I/O bridge 225 may, in one embodiment, be coupled to one or more controllers, such as an input controller 235 and a disk drive controller 240. The input controller 235 may control the operation of such devices as a keyboard 245, a mouse 250, and the like. The disk drive controller 240 may similarly control the operation of a storage device 255 and an I/O driver 260 such as a tape drive, a diskette, a compact disk drive, and the like. It should, however, be appreciated that, in alternative embodiments, the number and/or type of controllers that may be coupled to the I/O bridge 225 may change without departing from the spirit and scope of the present invention. For example, the I/O bridge 225 may also be coupled to audio devices, diskette drives, digital video disk drives, parallel ports, serial ports, a smart card, and the like.

An interface controller 265 may be coupled to the bus 215. In one embodiment, the interface controller 265 may be adapted to receive and/or transmit packets, datagrams, or other units of data over the private or public networks 110, 120, in accordance with network communication protocols such as the Internet Protocol (IP), other versions of IP like IPv6, or other packet-based standards as described above. Although not so limited, in alternative embodiments, the interface controller 265 may also be coupled to one or more IEEE 1394 buses, FireWire ports, universal serial bus ports, programmable read-only-memory ports, and/or 10/100Base-T Ethernet ports.

One or more output devices such as a monitor 270 may be coupled to the bus 215 via a graphics controller 275. The monitor 270 may be used to display information provided by the processor 200. For example, the monitor 270 may display documents, 2-D images, or 3-D renderings.

For clarity and ease of illustration, only selected functional blocks of the communication device 125 are illustrated in FIG. 2, although those skilled in the art will appreciate that the communication device 125 may comprise additional or fewer functional blocks. Additionally, it should be appreciated that FIG. 2 illustrates one possible configuration of the communication device 125 and that other configurations comprising different interconnections may also be possible without deviating from the spirit and scope of one or more embodiments of the present invention. For example, in an alternative embodiment, the communication device 125 may include additional or fewer bridges 220, 225. As an additional example, in an alternative embodiment, the interface controller 265 may be coupled to the processor 200 directly. Similarly, other configurations may be possible.

In the course of the normal operations of the communication device 125 described above, hardware and software components of the communication device 125 may operate in an incorrect or undesirable fashion and produce one or more errors. As utilized hereinafter, the term "error" refers to the incorrect or undesirable behavior of hardware devices or software applications executing in the system. For example, errors may comprise hardware errors such as a malfunctioning communication device 125 or they may comprise software errors such as an invalid request for access to a memory location. An error may cause the software, the hardware, or the system to become substantially unable to continue performing tasks, a condition that will be referred to hereinafter as a "crash." Errors may also comprise "faults," which generally refer to errors caused by a physical sub-system of the system. For example, when referring to errors caused by malfunctions of the memory, central processing unit (CPU), or other hardware, it is customary to refer to "memory faults," "CPU faults," and "hardware faults," respectively. Faults may also be caused by incorrect or undesirable behavior of software applications.

The one or more hardware or software components (or combinations thereof) of the communication device 125 may generate a variety of data in response to errors. Although not so limited, the data may include error messages, configuration files, core dumps, and portions of the data that may be stored in memory elements on the communication device 125. The data may, in one embodiment, be periodically removed or updated. For example, configuration files may be updated and/or removed when the communication device 125 is re-booted after a crash. When an error occurs, the communication device 125 may further be adapted to provide a message to notify one or more components in the communication device 125, and/or other devices that may be coupled to the private or public network 110, 120, that an error has occurred. Such a message will hereinafter be referred to as an "event message." Hereinafter, the error messages, the event messages, the log files, and other data and files that may be provided following an error will be referred to collectively as the "diagnostic information."

For example, diagnostic information may be provided by the communication device 125 when a hardware component like the I/O driver 260 malfunctions or otherwise operates in an undesirable manner. For a more specific example, the processor 200 may attempt to access a storage medium through the I/O driver 260. If the communication device 125, however, determines that there is no storage medium in the I/O driver 260, the communication device 125 may generate an error message. The error message may be displayed on the monitor 270, instructing the user to take an appropriate action. For example, the user may be instructed to insert the desired storage medium in the I/O driver 260 or to cancel the request. The error message may be written to a log file, which may be stored on the storage device 255.

Diagnostic information may also be generated when software executing on the communication device 125 performs in an unexpected or undesirable manner. For example, a memory access violation may occur when one process attempts to access a memory region that has been reserved by the operating system of the communication device 125 for another process. The memory access violation can cause unexpected or undesirable results to occur in the communication device 125. For example, a memory access violation may interrupt the execution of one or more processes, terminate all executing processes, or even cause the communication device 125 to hang or crash. In response to a memory access violation or other software errors, the communication device 125 may provide an error message that may be written to a log file. In one embodiment, the error message may include a name of the subroutine that caused the error, an indicator of the type or severity of the error, and the addresses of any memory locations that may have been affected by the error. In addition to providing the error message in response to a software error, such as the memory access violation in the illustrated example, the communication device 125 may generate diagnostic information, such as a core dump. It should be noted that software errors may occur at any of a variety of levels in the communication device 125. For example, errors may occur at a device driver level, operating system level, or application level.

Not all errors may generate associated diagnostic information. Nevertheless, a system administrator or technician may be able to determine the cause of the error by analyzing diagnostic information that is not directly associated with the error, but which may be produced by the communication device 125 as a consequence of the error. For example, in one embodiment, the communication device 125 may not detect an intermittent problem in a power supply in the storage device 255 and so may not create an error message. The intermittent problem may, however, cause errors in other hardware and/or software components of the communication device 125. The communication device 125 may detect these subsequent errors and generate a plurality of error messages and other diagnostic information that may be stored, if so desired, in the storage device 255.

Identifying the relevant diagnostic information and then determining the cause of the error may be a time-consuming task for the system administrator. Adding to the difficulty, diagnostic information associated with the various errors may not be available in a standardized form. For example, the error messages available in the communication device 125 in response to an error in a database program may differ from error messages available in response to an error in an Internet browser. Thus, in accordance with one embodiment of the present invention, a capture reporting system for accessing the diagnostic information, identifying a category of the error, and extracting one or more attributes of the error from the diagnostic information may be provided. The reports created by the capture reporting system may be used to determine the cause of the error and to debug the error. In one embodiment, the generated reports may be analyzed by a capture analysis system, as described below.

Figure 3A:
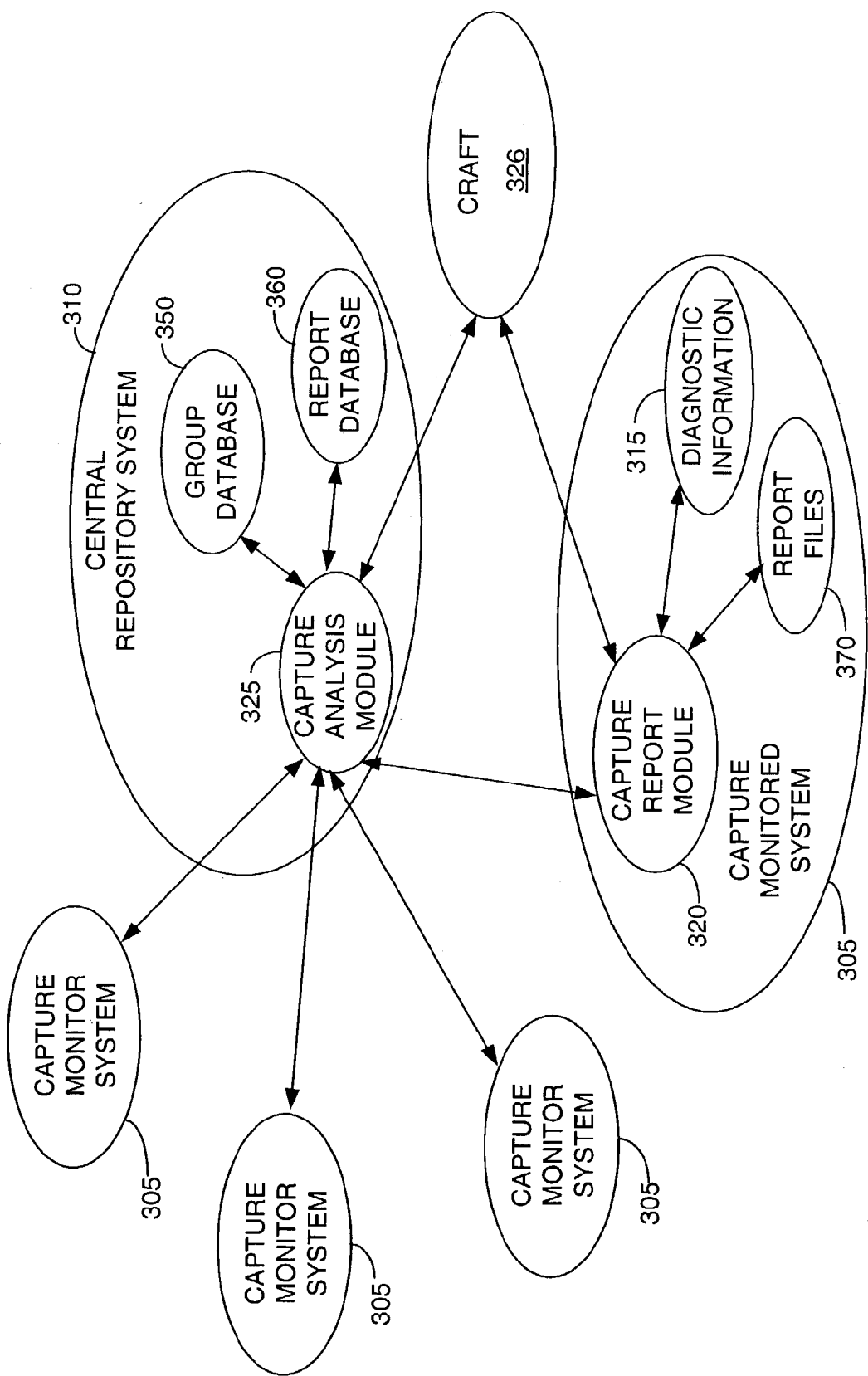
FIGS. 3A–C show exemplary error capture report and analysis systems that may be used in the communications device illustrated in FIG. 2 and the communications network illustrated in FIG. 1, in accordance with one embodiment of the present invention.

Referring now to FIG. 3A, a stylized diagram of an exemplary error capture and analysis system 300 that may be used to gather and analyze diagnostic information is shown. The error capture and analysis system 300 may, in one embodiment, comprise one or more capture monitored systems 305 and a central repository system 310. The systems 305, 310 may be formed of one or more communications devices 125, which may be coupled by a network. The systems 305, 310 and the manner in which they are interconnected in FIG. 3A are for illustrative purposes only, and thus the systems 305, 310 may, in alternative embodiments, be interconnected in any other desirable manner. For example, the central repository system 310 may be coupled to the one or more capture monitored systems 305 by a private or public network 110, 120, as described above. However, it should also, be appreciated that the capture monitored system 305 and the central repository system 310 may, in alternative embodiments, be implemented in a single communication device 125.

In one embodiment, the capture monitored system 305 may have one or more software applications, such as operating systems, executing therein that may generate errors. Hardware components may also generate errors in the capture monitored system 305. To reduce the number of errors in the shipped versions of the one or more software applications and/or hardware components in the capture monitored system 305, collectively referred to hereinafter as the "product under development," developers may wish to evaluate or test the product under development before shipping. After the capture monitored system 305 has been installed, system administrators may wish to debug errors in the capture monitored system 305 to evaluate or further test the product under development.

The software and/or hardware errors may cause the capture monitored system 305 to provide associated diagnostic information 315 that may be stored on the capture monitored system 305, as described above. Evaluating and testing the product under development may therefore, in one embodiment, include accessing and analyzing diagnostic information 315 that may be stored on the capture monitored system 305. To this extent, the capture monitored system 305 may include a capture report module 320 and the central repository system 310 may include a capture analysis module 325 for accessing and analyzing the diagnostic information 315. The modules 320, 325 may be implemented in hardware, software, or a combination thereof. The capture report module 320 may be used by the capture monitored system 305 to spawn one or more report daemon processes. Hereinafter, the term "report daemon process" refers to a process spawned by the capture report module 320 that runs as a silent background process and may or may not be visible to the user. However, it should be noted that, in alternative embodiments, a non-daemon process may also be utilized. The report daemon process spawned by the capture report module 320 may detect the occurrence of errors by detecting a triggering event occurring in the capture monitored system 305. As used hereinafter, the term "triggering event" refers to an event or sequence of events that may be a consequence of, or related to, an error. For example, the triggering event may comprise an event message, which may be provided by the capture monitored system 305 in response to an error.

The report daemon process may also detect the occurrence of errors by detecting a triggering event comprising a sequence of one or more non-event messages. Non-event messages may be provided in response to the error by one or more components of the capture monitored system 305 such as the operating system, other software applications, or hardware components. The capture monitored system 305 may store the non-event messages and may not take any further action in response to the non-event messages. The capture report module 320 may, in one embodiment, periodically access the diagnostic information 315 and detect sequences of non-event messages that may have been stored elsewhere on the capture report system 305. In one embodiment, the capture report module 320 may use pre-defined sequences of non-event messages as triggering events. The capture report module 320 may, in alternative embodiments, allow users to define one or more sequences of non-event messages as triggering events.

In response to a triggering event, the system 300 may access and analyze the diagnostic information 315 associated with the associated error. To facilitate accessing and analyzing the diagnostic information 315, according to one embodiment of the present invention, the capture report module 320 and capture analysis module 325 may use a capture reference attribute function table (CRAFT) 326. In one embodiment, the CRAFT 326 may be integrated in the systems 305, 315, although for the sake of clarity the CRAFT 326 is depicted as a stand-alone entity in FIG. 3. In alternative embodiments, portions of the CRAFT 326 may be distributed among the one or more capture monitored systems 305, the central repository system 310, and/or other systems (not shown).

Figure 3B:
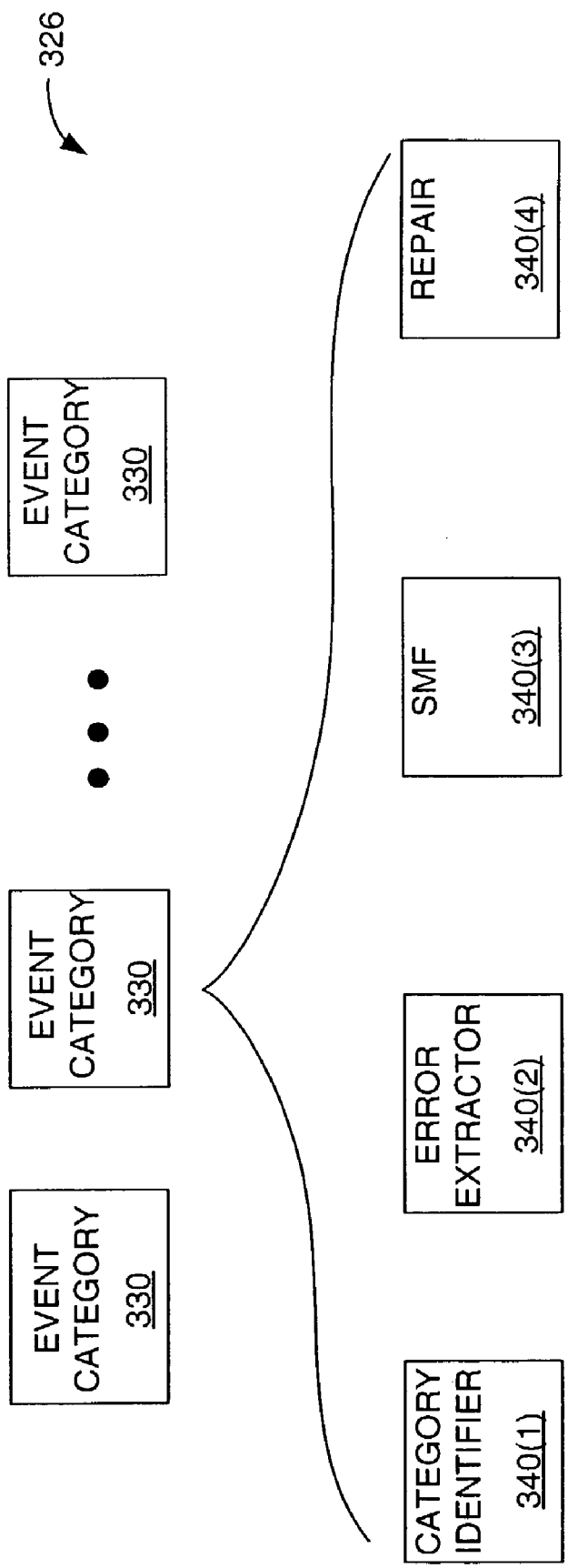

Referring now to FIG. 3B, a database structure that may be used to implement the CRAFT 326 is shown. According to one embodiment of the present invention, entries in the CRAFT 326 may be indexed by an event category 330. Hereinafter, the term "event category" refers to errors that may have a common source, cause, or other common characteristic. For example, the event categories 330 may include, but are not limited to, operating system errors, software application errors, peripheral device errors, networking errors, system hardware errors, and the like. In one embodiment, the event categories 330 may be implemented as a set of category definitions in the object-oriented programming language JAVA. In alternative embodiments, other programming languages such as Perl, C, C++, and the like may be used to implement the event categories 330. The event categories 330 in the CRAFT 326 may be associated with a set of functions 340(1–4). The functions 340(1–4) may perform specific tasks relevant to each event category 330. Although not so limited, the functions 340(1–4) may include a category identifier 340(1), an error information extractor 340(2), a similarity matching function (SMF) 340(3), and a repair function 340(4). In one embodiment, the functions 340(1–4) may be implemented as one or more shell scripts.

According to one embodiment of the present invention, selected functions 340(1–2) in the CRAFT 326 may be used by the capture report module 320 to access diagnostic information 315 associated with an error. For example, the category identifier 340(1) may be used by the capture report module 320 to verify that an error may be a member of the event category 330. For another example, the capture report module 320 may use the error information extractor function 340(2) to access the diagnostic information, extract error attributes from the diagnostic information 315, and generate one or more error attribute strings. The one or more error attribute strings may include information derived from the diagnostic information 315. For example, the capture report module 320 may use the shell scripts that implement the error extractor 340(2) to extract a "Panic String," a "Host ID," and a "Panic Stack Trace" from the core dump caused by an error and save them as three error attribute strings.

Figure 3C:
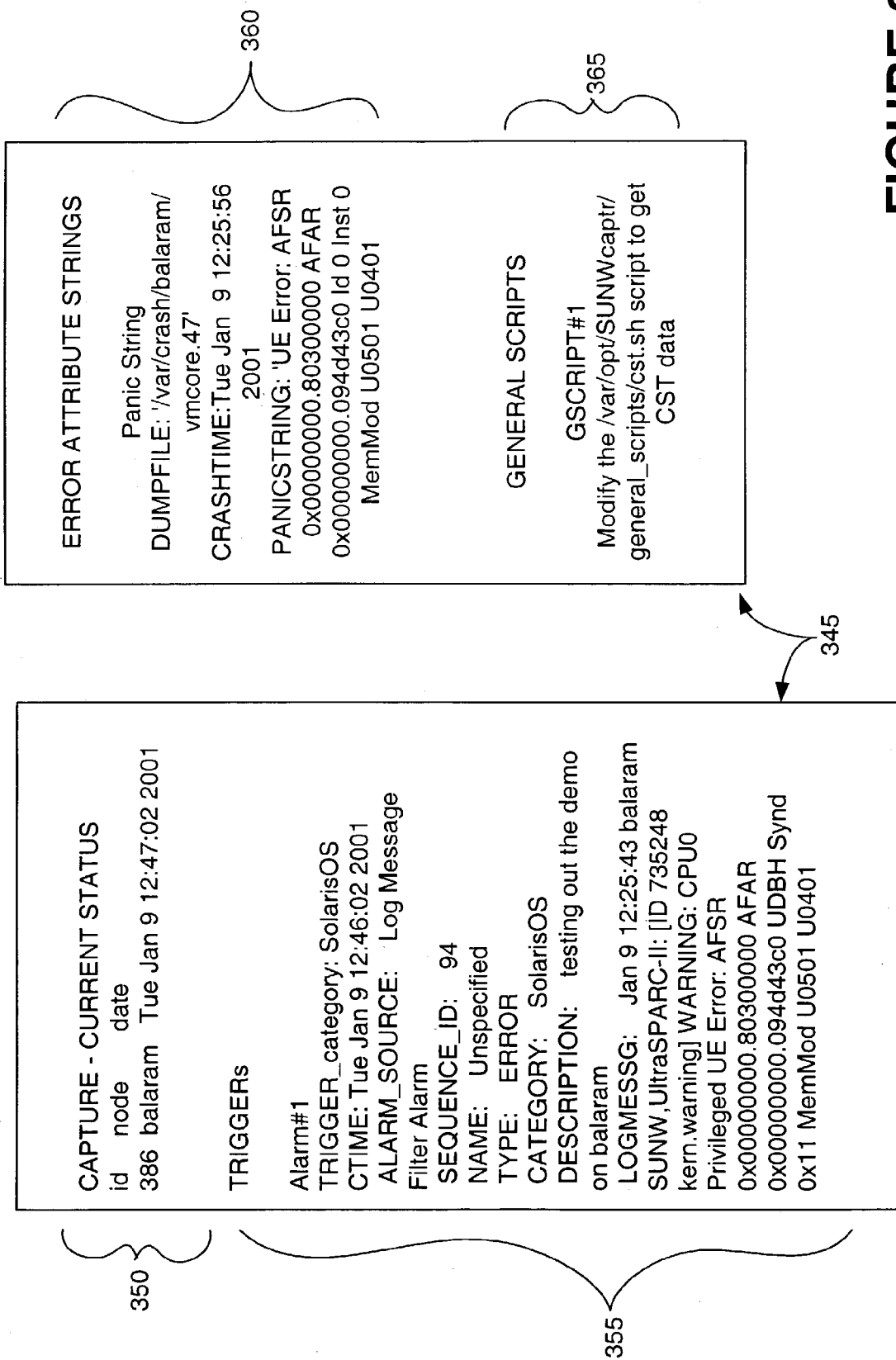

The selected functions 340(1–2) may also create a capture report 345 from the error attribute strings and other portions of the diagnostic information 315. Referring to FIG. 3C, an abridged example of a capture report 345 that may be provided by one embodiment of the capture report module 320 is shown. In this example, the capture report 345 includes header 350 that may include such information as an identification number, "386", the name of the node from which the error was captured, "balaram," and the date of the capture, "Tue Jan. 9 12:47:02 2001." The capture report 345 may also include a trigger section 355 that may include portions of the diagnostic information 315 related to the triggering event such as the time of the error, the class of the error, and the like. In this example, the trigger section 355 also includes a category of the trigger and a category of the error ("SolarisOS"), a time when the trigger was detected ("Tue Jan. 9 12:46:02 2001"), and a log message associated with the error ("LOGMESSG: Jan 9 12:25:43 balaram . . . ").

In one embodiment, the capture report 345 may further include one or more error attribute strings 360 created by the capture report daemon. In this example, the error attribute string 360 includes the location of portions of the diagnostic information 315 used to create the error attribute string 360 ("DUMPFILE: . . . "), a time associated with a system crash ("CRASHTIME: . . . "), and a panic string. A record 365 of any other general scripts that may have been executed in response to the error may be included in the capture report 345. In the example shown in FIG. 3C, the record 365 indicates that GSCRIPT#1 was executed to modify a script that may be used to extract data from the diagnostic information 315. The capture report module 320 may store the capture report 345 as one or more report files 370 in the capture monitored system 305, as shown in FIG. 3A.

In one embodiment, the capture report 345 may be provided to the capture analysis module 325 in the central repository system 310, which may analyze the capture report 345. The selected functions 340(3–4) in the CRAFT 326 depicted in FIG. 3B may, in one embodiment, be used by the capture analysis module 325 to analyze diagnostic information 315 associated with the error. For example, the capture analysis module 325 may use the similarity matching function 340(3) to determine a percent likelihood that the error is a member of a pre-defined group of errors, such as those that may be stored in the group database 350. For another example, the capture analysis module 325 may use the repair function 340(4) to suggest possible methods of debugging the error, based upon the percent likelihood that the error is a member of a pre-defined group of errors with a known solution. The selected functions 340(3–4) may also perform such actions as defining new groups of errors and storing them in a group database 350, and the like. The capture report 345 provided by the capture report module 320 may be stored in a report database 360 for later analysis or to be used in the statistical analysis of later capture reports 345.

Figure 4:
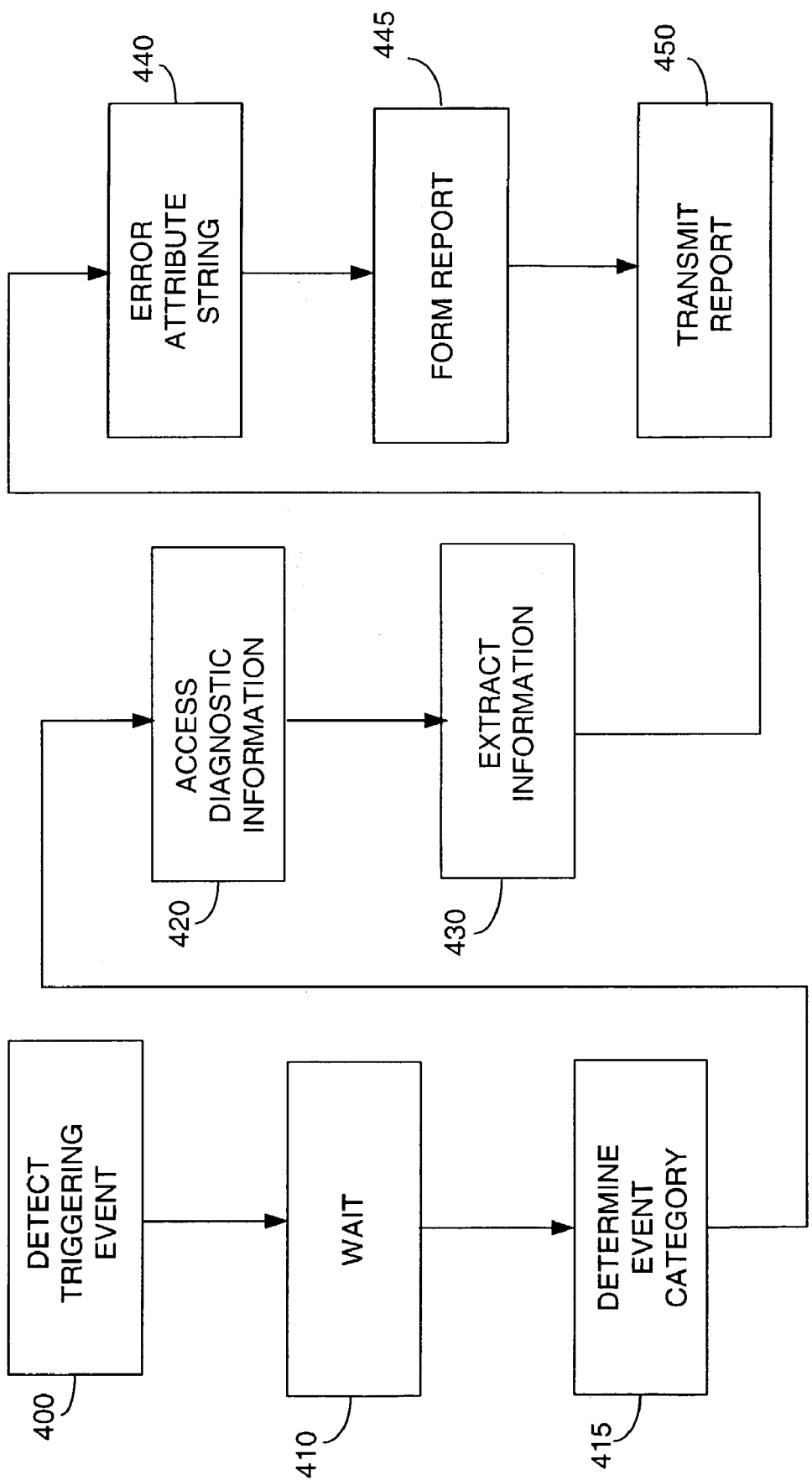
FIG. 4 shows a flow diagram of a method of gathering error messages from the capture report system depicted in FIG. 3, in accordance with one embodiment of the present invention.

FIG. 4 shows a flow diagram that illustrates one method of accessing the diagnostic information 315, identifying the category associated with the error, extracting error attributes, and creating the capture report 345. According to one embodiment of the present invention, the capture monitored system 305 may detect (at 400) a triggering event provided as a consequence of an error occurring in the capture monitored system 305, as described above. The report daemon process may, in one embodiment, wait (at 410) for a predetermined time to allow the error to propagate through the capture monitored system 305, as well as to allow the diagnostic information 315 to be stored in the capture monitored system 305. The capture report daemon may then determine (at 415) the event category of the error by comparing the event message or the sequence of messages to the event categories using the category identifier function 340(1) in the CRAFT 326.

The report daemon process may access (at 420) the diagnostic information 315 that may have been created as a consequence of the error. The report daemon process may then, in one embodiment, use the error extractor 340(2) to extract (at 430) information from the diagnostic information 315. For example, the report daemon process may execute one or more shell scripts in the CRAFT 326 that may perform one or more error extraction functions that include, but are not limited to, searching the log messages for panic strings, memory addresses, and indications of the severity of the error.

The report daemon process may use the extracted information to create (at 440) one or more error attribute strings. In one embodiment, the error attribute strings may comprise information derived from the error messages that may be stored in the error files. The derived information may, for example, indicate the hardware or software components in which the error occurred, the memory locations affected by the error, and the severity of the error. The error attribute strings may have any one of a variety of formats. For example, the error attribute string may be formatted in Extensible Markup Language (XML).

The report daemon process may combine the error attribute strings with other relevant data as described above to form (at 445) a report, which the report daemon process may transmit (at 450) to the capture analysis module 325 of the central repository system 310 by any one of a variety of means well known to persons of ordinary skill in the art. For example, the report daemon process may include the report in an email message and send the email message to the capture analysis module 325 of the central repository system 310 over the private or public network 110, 120. For another example, the report daemon process may transmit the report over the private or public networks 110, 120 to the central repository system 310.

By determining the event category 330, accessing the diagnostic information 315, extracting one or more attributes of the error from the diagnostic information 315, and then forming a capture report 345, the capture report module 320 may reduce the time required to determine the cause of errors in the capture monitored system 305, as well as the time to debug the error. For example, the capture analysis module 325 may use the capture reports 345 to categorize the errors and suggest fixes by comparing the capture reports 345 associated with the errors to previously gathered capture reports 345. Similarly, the system administrator may use the capture reports 345 to locate the cause of an error in the capture monitored system 305.

As a more specific example, an engineering team may, using one or more embodiments of the present invention, test an upgrade of an operating system before shipping the operating system. That is, the engineering team may first install the operating system on one or more capture monitored systems 305. The capture monitored systems 305 may comprise a variety of systems, including personal computers manufactured by a variety of different vendors. The capture monitored systems 305 may then be continuously operated with a variety of applications operating therein. Over time, errors may occur as the operating system interacts with the various hardware and software components of the capture monitored systems 305. The capture report module 320 may categorize these errors, which may reveal one or more shortcomings in the operating system under test. For example, an error may cause the operating system to repeatedly crash when a particular software application performs a specific task on a certain vendor's personal computer. The engineering team may use this information to identify and repair the error before shipping the upgraded version of the operating system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing information associated with an error;
   identifying a category associated with the error based upon the accessed information, wherein identifying the category associated with the error comprises comparing at least a portion of the accessed information associated with the error to at least one event category defined in a table; and
   accessing at least one pre-determined attribute in the accessed information based upon the identified category.

2. The method of claim 1, wherein accessing the information comprises accessing the information in response to detecting a triggering event.

3. The method of claim 2, wherein detecting the triggering event comprises detecting an event message provided by a system in which the error occurred.

4. The method of claim 3, wherein detecting the triggering event comprises detecting a sequence of at least one non-event message provided by the system in which the error occurred.

5. The method of claim 2, wherein accessing the information comprises waking a sleeping process, in response to detecting the triggering event, to access the information associated with the error.

6. The method of claim 5, wherein accessing the information comprises scanning the system for the information associated with the error.

7. The method of claim 1, wherein comparing the portion of the accessed information associated with the error to the at least one event category in the table comprises comparing the portion of the accessed information associated with the error to at least one of an operating system error, a software application error, a peripheral device error, a networking error, and a system hardware error.

8. The method of claim 1, wherein accessing the at least one pre-determined attribute in the accessed information comprises extracting a selected portion of the accessed information.

9. The method of claim 8, wherein accessing the at least one pre-determined attribute comprises forming an error attribute string from the selected portion of the accessed information.

10. The method of claim 9, wherein forming the error attribute string comprises forming the error attribute string using Extensible Markup Language (XML).

11. The method of claim 10, further comprising generating a report from the at least one error attribute string and at least one of a time stamp, an identification number, and a system identifier.

12. The method of claim 11, further comprising transmitting the report to a second system.

13. The method of claim 12, wherein transmitting the report comprises at least one of sending an email message to the second system over a network and transmitting the report to the second system over the network.

14. A method, comprising:
    detecting a triggering event associated with an error occurring in at least one capture monitored system;
    accessing information associated with the error in response to detecting the triggering event;
    identifying a category associated with the error based on the accessed information, wherein identifying the category associated with the error comprises identifying the category associated with the error by applying a category definition stored in a table to the accessed information; and
    generating a report from the accessed information based upon the identified category.

15. The method of claim 14, wherein detecting the triggering event comprises detecting at least one of an event message and a sequence of non-event messages.

16. The method of claim 14, wherein the category definition comprises a JAVA category definition.

17. The method of claim 14, wherein generating the report comprises combining at least one of an identification number, a date, an event category, and an error attribute string.

18. The method of claim 14, further comprising providing a report to the repository system.

19. The method of claim 18, wherein providing the report to the repository system comprises transmitting the report from the monitor system to the repository system over a network.

20. An article comprising one or more machine-readable storage media containing instructions that when executed enable a processor to:
    detect an error in at least one capture monitored system;
    access information associated with the error;
    identify a category associated with the error based upon the accessed information by comparing at least a portion of the accessed information associated with the error to at least one event category defined in a table;
    access at least one error attribute associated with the identified category; and
    generate a report including at least one error attribute.

21. The article of claim 20, wherein the instructions when executed enable the processor to detect a triggering event occurring in the capture monitored system in response to detecting the error.

22. The article of claim 20, wherein the instructions when executed enable the processor to access the error attribute by applying at least one function to the accessed information, wherein the function is a shell script stored in a table.

23. The article of claim 20, wherein the instructions when executed enable the processor to transmit the report to a repository system.

24. The article of claim 23, wherein the instructions when executed enable the processor to transmit the report over a network to the repository system.

25. An apparatus, comprising:
    a bus; and
    a processor coupled to the bus, wherein the processor is adapted to detect a triggering event associated with an error, to wake a sleeping process to access information associated with the error in response to detecting the triggering event, to categorize the error based on the accessed information, to access selected information from the accessed information based on the category of the error, and to generate a report based on the selected information using the information associated with the error including at least one of a time stamp, an identification number, and a system identifier.

26. The apparatus of claim 25, wherein the processor is adapted to detect the triggering event by detecting at least one of an event message and a sequence of at least one non-event message.

27. The apparatus of claim 25, wherein the processor is adapted to categorize the error as at least one of an operating system error, a software application error, a peripheral device error, a networking error, and a system hardware error.

28. The apparatus of claim 25, further comprising a storage device coupled to the bus, wherein the storage device is adapted to store the report generated by the processor.

29. The apparatus of claim 25, further comprising an interface coupled to the bus and coupled to a network, wherein the interface is adapted to transmit the report to the network.

* * * * *